Sept. 5, 1939.　　　　W. V. JOHNSON　　　　2,172,202
DIRECT CURRENT TO ALTERNATING CURRENT CONVERTERS
Filed Jan. 9, 1937
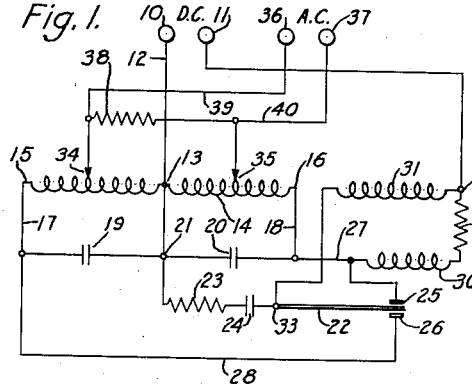
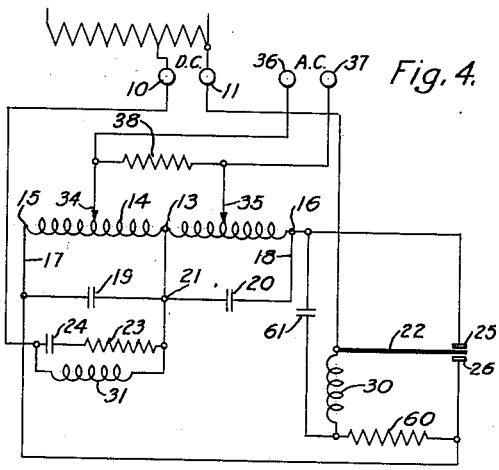
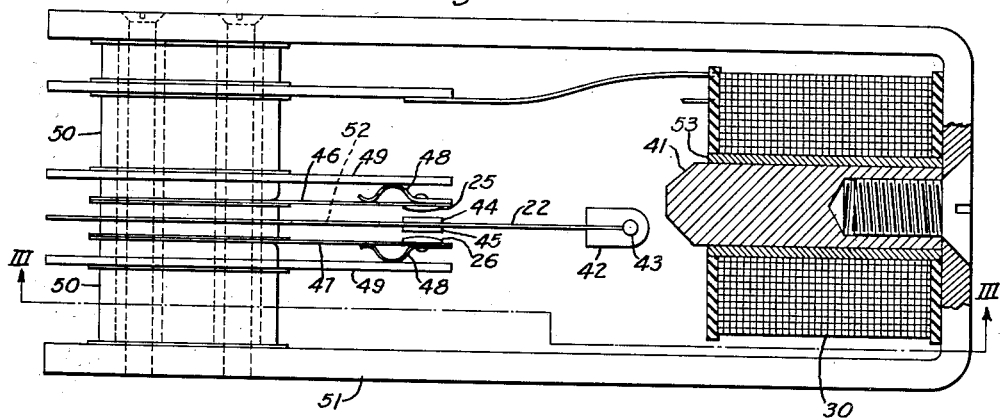
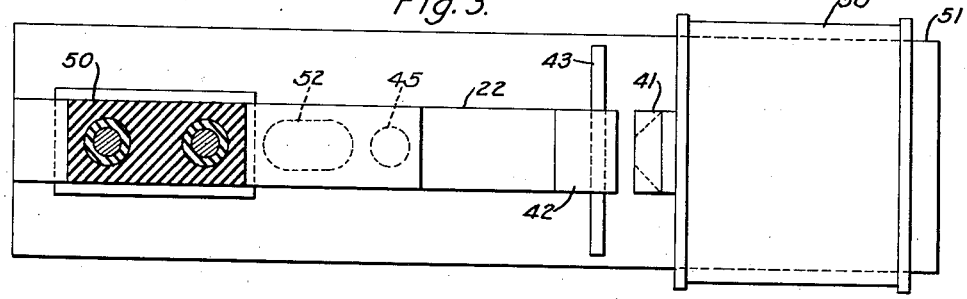
WITNESSES:
INVENTOR
Welton V. Johnson
BY
ATTORNEY Patented Sept. 5, 1939

2,172,202

UNITED STATES PATENT OFFICE 2,172,202

DIRECT CURRENT TO ALTERNATING CURRENT CONVERTERS

Welton V. Johnson, East Orange, N. J., assignor to Westinghouse Electric & Manufacturing Company, East Pittsburgh, Pa., a corporation of Pennsylvania Application January 9, 1937, Serial No. 119,794

5 Claims. (Cl. 175—365)

My invention relates to converters and especially to converters utilizing a vibrating reed for converting direct current to alternating current.

An object of my invention is to produce sinusoidal waves in the output of the converter.

Another object of my invention is to provide a converter that has rapid starting and accurate frequency maintenance irrespective of load within its rated limits.

Other objects and advantages of the invention will be apparent from the following description taken in conjunction with the drawing, in which Figure 1 is a diagrammatic circuit illustrative of a preferred embodiment of my invention.

Fig. 2 is a side elevation with certain parts in cross section of a vibrator for use in connection with my invention.

Fig. 3 is a sectional view of the vibrator on line III—III of Fig. 2, and

Fig. 4 is a modification of the circuit in Fig. 1.

My invention was particularly developed for use with the synchronous motor by means of which timing devices can be operated from direct current. When the alternating current lines are in trouble, the timing relays of a station are most needed and very frequently the only reliable source of power is a station battery. My invention makes available a small quantity of direct current into 60 cycle 115 volt alternating current. The invention, however, is not limited to timing devices and, of course, the output could be varied for other frequency and voltage, if desired.

In Fig. 1, I have illustrated a preferred circuit arrangement of my invention and in Fig. 4 a slightly modified circuit having similar numerals for similar elements. The direct current input circuit has terminals 10 and 11, one of which is connected by 12 to the midpoint 13 of a tank circuit inductance 14. This tank circuit inductance is in the form of an auto-transformer and has extending from its ends 15 and 16, conductors 17 and 18 that are, in turn, interconnected with capacitances 19 and 20 with the mid-connection 21 between these two capacitors connected to the midpoint 13 on the tank circuit inductance. The capacitors 19 and 20 form with the transformer 14 a tuned tank circuit that is in resonance. The midpoints 13 and 21 are connected to a vibrating reed 22 whose preferred specific form is illustrated in Figs. 2 and 3. Intermediate the points 13, 21 of the tuned circuit and the vibrating reed 22 is an electrical shock absorber preferably composed of a resistance 23 in series with the capacitor 24. The vibrator makes contact in turn with two contact points 25 and 26 as it vibrates and these contact points are connected by 27 and 28 with the opposite ends of the tuned tank circuit. The direct current input terminal 11 is preferably connected to one of the contact points 25 through a resistance 29 and a coil 30 for vibrating the reed. I also connect a series reactor 31 preferably intermediate the one side of the input circuit at 32 to the vibrating reed at 33. The alternating current output is taken from the points 34 and 35 across the tank circuit inductance 14 and these points 34 and 35 are preferably symmetrical in respect to the center point 13 of the tank circuit inductance. These points may be varied in their relationship with the center point to provide the desired voltage. The terminals 36 and 37 constitute the output terminals for the alternating current. A resistance 38 may be placed across the two lines 39 and 40 from the tank circuit to the alternating current output points, if desired.

Fig. 4 is a circuit slightly modified from that of Fig. 1 and in which the elements are similarly numbered. Fig. 4 illustrates how the circuit might be modified in arrangement. The tank circuit of the inductance 14 and capacitance 19 and 20 is similar to that of Fig. 1 as well as the input circuit, output circuit, vibrator coil, etc. The series reactance coil 31 is illustrated as in shunt with the capacitance 24 and resistance 23 in one of the direct current input leads. The capacitance and resistance absorb the high voltage of the series reactor when the vibrator contacts open.

A second resistor 60 and condenser 61 is provided connected to the vibrator coil 30. This gives frequency stabilization with varying load. It also reduces the alternating current in the vibrator coil, which in turn reduces the amplitude of vibration, and by permitting the direct current in the coil to be increased it results in low-starting voltage.

In Figs. 2 and 3, the vibrating reed 22 is illustrated in its preferred form, vibrated by the coil 30, which has a central core 41. This core is surrounded by an absorption loop 53 preferably copper. The vibrator coil and magnetic circuit is designed to permit accurate frequency control with variable input voltage and load. The reed is located off center of this core, as illustrated in Fig. 2. In my preferred embodiment, this offset is approximately 75 mils. The vibrating reed has a mass 42 on its end with a rod 43 which may be cut off or bent to adjust for frequency. The reed has contact spots 44 and 45 which make contact with the contact points 25 and 26 previously mentioned in connection with Fig. 1. The spacing of these contacts has been exaggerated for the sake of clearness as the spacing is approximately .007 inch on each side of 44 and 45. These contact points are preferably located on arms 46 and 47 having buffer springs 48 bearing against plates 49. The buffer springs are so designed that the contact surface part of 25 or 26 will always be parallel to the surfaces of 44 and 45 for all amplitudes of vibration when the contacts are in contact.

These various parts may be assembled in the desired relationship by means of various spacers 50 located in the metal framework 51.

The reed is tuned to maintain the desired frequency and to supply impulses to the tank circuit inductance 14 and capacitance 19 and 20 to maintain an alternating wave form throughout the cycle. The reed has the opening 52 shown in Fig. 3 to make it very flexible and to permit low voltage starting. The series reactor in connection with the rest of the circuit provides a practically perfect sinusoidal wave. The series reactor is the same size as the tank reactor and has the proper characteristics to reduce the instantaneous tank circuit charging current, to reduce the contact duty and to aid in obtaining the excellent wave form. The resistance 23 and capacitor 24 absorb the reactor energy when the contacts are open so that practically sparkless operation is obtained even at full load. The reactance 14 is preferably in an auto-transformer form and it can supply the load at any desired pressure ranging from no voltage to a maximum of approximately double the direct current line voltage without using any extra turns. I prefer to construct the vibrator reed from spring steel material. The contacts and the weight at the end is readily adjustable to facilitate frequency calibration. The reed operates at a very low frequency for amplitudes of vibration where the contacts do not touch and then automatically changes to a second frequency at higher amplitudes. This feature facilitates starting at low voltage, which is a very important requirement. The stationary contacts are arranged to have low resilience, the contact surface to be parallel with the moving contact force even with large contact travel and the friction damping between the curved buffer springs and the back plate is sufficient to reduce contact bounce to an absolute minimum.

The voltage across the outside terminals 15 and 16 of the inductance 14 is approximately twice that of the direct current line voltage. As previously mentioned, this inductance is tapped in auto-transformer fashion symmetrically about the center shaft for the voltage desired. The symmetrical tapping is done to reduce the direct current component in the output circuit. If a low voltage direct current source is to be used for a high alternating current supply, additional turns may be used on each end of the present coil to step up the voltage to the proper amount.

The series reactor, as previously mentioned, maintains a good wave form and it also permits low duty on the contacts. This reactor is used as a sort of a buffer to secure rather uniform current during the tank circuit charging period. The vibrator coil and its magnetic circuit illustrated in Figs. 2 and 3 are designed to permit accurate frequency control with varied input voltage in load. The vibration amplitude changes only very slightly with a change of direct current input from 90 to 130 volts. A saturated core may be used at 41 instead of that shown in Fig. 2, with an alternating current component absorption loop 53, a magnetic path to the frame 51 and the proper core shape.

When the direct current is first applied, current flows through the vibrator operating coil and magnetically pulls the reed armature 42 towards the center line of the operating coil pole face. Before this position is reached, however, contacts 25 and 44 short circuit the vibrator coil, releases the armature, allowing it to fall back to its inoperative position at which time it breaks the circuit between contacts 25 and 44, and again energizes the vibrating operating coil. After one or two oscillations of the reed, the armature assumes sufficient oscillatory swing to make contact between 26 and 45. Each time contact 44 makes contact with 25 and also when contacts are made between 26 and 45, impulses are given to the tank circuit which keep it oscillating at a frequency determined by the mechanical vibrating characteristics of the armature.

The series reactor 31 reduces the inrush of current to the tank circuit when the contacts make. After the reactor current has reached its maximum, its energy is dissipated into the tank circuit until the contacts break. The energy left in the reactor is then absorbed in resistor 23. The capacitor 24 in series with resistor 23 is used to block direct current from flowing through resistor 23. Resistor 60 and capacitor 61 in Fig. 4 are used to provide a bypass for the alternating current output of the tank circuit from going through operating coil 30 in larger quantities than desired to secure the right amplitude of armature vibration. The values are so adjusted that the vibrator changes its magnitude of vibration, and frequency, imperceptibly with load.

Among the many advantages of my invention is that of rapid starting, accurate frequency maintenance irrespective of load, efficiency in operation, low cost adaptability for various input voltages, long life and quiet operation with contacts normally open. Furthermore, the output voltage need not be in the same exact ratio to the input voltage. Most important of all, however, is the practically perfect wave form of the alternating current output circuit.

While I have described a preferred embodiment of my invention, it is apparent that many changes may be made in the shape, number and arrangement of parts, and accordingly I desire only such limitations on the following claims as are imposed by the prior art.

I claim as my invention:

1. Inverter apparatus comprising a direct current input circuit, a tank circuit, vibrator means varying the application of the direct current input circuit to said tank circuit, an alternating current output circuit connected to said tank circuit and means shaping said alternating current to sinusoidal form.

2. Inverter apparatus comprising a direct current input circuit, a tank circuit, vibrator means varying the application of the direct current input circuit to said tank circuit, a series reactor intermediate said input circuit and said tank circuit, a serially connected resistor and capacitor connected in circuit of current flowing from said input circuit to one terminal of said vibrator means, and an alternating current output circuit connected to said tank circuit.

3. Inverter apparatus comprising a direct current input circuit, a tank inductance, vibrator means varying the application of the direct current input circuit to said inductance, capacitance connected to said inductance and forming a resonance tank circuit therewith, a series reactor intermediate said input circuit and said tank circuit, a serially connected resistor and capacitor connected in circuit of current flowing from said input circuit to one terminal of said vibrator means, and an alternating current output circuit connected to said tank circuit.

4. Inverter apparatus comprising an inductance with a center tap, a separate capacitor connected between said center tap and each end of said inductance, a direct-current source connected to said center tap, a pair of separable contacts having a fixed period of vibration, one of said contacts being connected to one terminal of said source, the other of said separable contacts being connected to one end of said inductance, a motor-means for driving said separable contacts connected thereto to have its current change in value when said separable contacts close, and a second inductance connected to be traversed by the current from said source to said separable contacts.

5. Inverter apparatus comprising an inductance with a center tap, a separate capacitor connected between said center tap and each end of said inductance, a direct-current source connected to said center tap, a pair of separable contacts having a fixed period of vibration, one of said contacts being connected to one terminal of said source, the other of said separable contacts being connected to one end of said inductance, a motor-means for driving said separable contacts connected thereto to have its current change in value when said separable contacts close, a resistor and a capacitor connected in series with the current flowing from said source to said center tap, and a second inductance connected to be traversed by the current from said source to said separable contacts.

WELTON V. JOHNSON.